United States Patent
Geiger et al.

(10) Patent No.: US 9,618,622 B2
(45) Date of Patent: Apr. 11, 2017

(54) OPTICAL OBJECT-DETECTION DEVICE HAVING A MEMS AND MOTOR VEHICLE HAVING SUCH A DETECTION DEVICE

(71) Applicant: VALEO Schalter und Sensoren GmbH, Bietigheim-Bissingen (DE)

(72) Inventors: Tobias Geiger, Bietigheim-Bissingen (DE); Manja Greimeier, Mannheim (DE); Michael Kiehn, Hamburg (DE); Michael Koehler, Hamburg (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 113 days.

(21) Appl. No.: 14/653,385

(22) PCT Filed: Sep. 19, 2013

(86) PCT No.: PCT/EP2013/069421
§ 371 (c)(1),
(2) Date: Jun. 18, 2015

(87) PCT Pub. No.: WO2014/095105
PCT Pub. Date: Jun. 26, 2014

(65) Prior Publication Data
US 2015/0301182 A1   Oct. 22, 2015

(30) Foreign Application Priority Data
Dec. 21, 2012  (DE) .................. 10 2012 025 281

(51) Int. Cl.
*G01S 7/48* (2006.01)
*G01S 17/93* (2006.01)
(Continued)

(52) U.S. Cl.
CPC ........... *G01S 17/936* (2013.01); *G01S 7/4811* (2013.01); *G01S 7/4813* (2013.01); *G01S 7/4816* (2013.01); *G01S 7/4817* (2013.01); *G01S 17/026* (2013.01)

(58) Field of Classification Search
CPC . G01S 7/4813; G01S 7/4816; G02B 26/0858; G02B 13/0005
See application file for complete search history.

(56) References Cited

U.S. PATENT DOCUMENTS

2004/0212863 A1   10/2004   Schanz et al.
2007/0222678 A1*   9/2007   Ishio .................. G01S 7/4811
                                                 342/372
(Continued)

FOREIGN PATENT DOCUMENTS

DE   102005049471 A1   5/2007
EP         0290128 A2   11/1988
(Continued)

OTHER PUBLICATIONS

International Search Report issued in PCT/EP2013/069421, mailed Nov. 4, 2013 (3 pages).
(Continued)

Primary Examiner — Tony Ko
(74) Attorney, Agent, or Firm — Osha Liang LLP

(57) ABSTRACT

An optical object sensing device for a motor vehicle, having an emitter unit for emitting an emission light beam and having a receiver unit for receiving a reception light beam, and having an electronic evaluation device for detecting an object external to the vehicle in a vicinity of the motor vehicle as a function of the reception light beam. The emitter unit includes an emitter for generating the emission light beam, a controllable micromirror by which the emission light beam can be panned at least in a first panning direction, and an emission lens arranged behind the micromirror in the
(Continued)

emission beam path, where at least along the first panning direction, the emission lens is configured as a concave-convex lens with a concavely curved surface, which faces towards the micromirror, and with a convexly curved surface.

12 Claims, 4 Drawing Sheets

(51) Int. Cl.
  *G01S 17/02* (2006.01)
  *G01S 7/481* (2006.01)

(56) References Cited

U.S. PATENT DOCUMENTS

| | | |
|---|---|---|
| 2008/0023552 A1 | 1/2008 | Gillet et al. |
| 2008/0046150 A1* | 2/2008 | Breed ............... B60R 21/0134 701/45 |
| 2009/0244672 A1* | 10/2009 | Shih .................. G02B 13/0005 359/206.1 |
| 2010/0073750 A1 | 3/2010 | Yamaguchi et al. |
| 2011/0051756 A1 | 3/2011 | Morimoto et al. |
| 2012/0069415 A1 | 3/2012 | Freeman et al. |

FOREIGN PATENT DOCUMENTS

| | | |
|---|---|---|
| EP | 1792775 A2 | 6/2007 |
| EP | 2124069 A1 | 11/2009 |
| JP | 2007317109 A | 12/2007 |
| WO | 2012028388 A1 | 3/2012 |

OTHER PUBLICATIONS

German Search Report issued in corresponding German application No. 10 2012 025 281.1, mailed Apr. 30, 2013 (5 pages).

\* cited by examiner

OPTICAL OBJECT-DETECTION DEVICE HAVING A MEMS AND MOTOR VEHICLE HAVING SUCH A DETECTION DEVICE

The invention relates to an optical or optoelectronic object sensing device for a motor vehicle, having an emitter unit for emitting an emission light beam and having a receiver unit for receiving a reception light beam (i.e. the emission light beam reflected by an object), and having an electronic evaluation device for detecting an object external to the vehicle in a vicinity of the motor vehicle as a function of the reception light beam. The emitter unit comprises an emitter—in particular a laser diode—for generating the emission light beam, a controllable micromirror (so-called "MEMS") by means of which the emission light beam can be panned at least in a first panning direction, and an emission lens arranged behind the micromirror in the emission beam path and through which the emission light beam deviated by the micromirror is emitted. The invention furthermore relates to a motor vehicle, i.e. in particular a motor car, having such an object sensing device.

The interest in the present case is particularly in a laser scanner in which a micromirror, the so-called MEMS, is used, by means of which the emission light rays can be deviated before they are emitted through an emission lens. It is already prior art to use such a micromirror for panning the emission beam, in order overall to achieve a relatively wide sensing range and to be able to scan a correspondingly wide vicinity range. With such an object sensing device, the vicinity of the motor vehicle can be scanned and objects in the vicinity, which may possibly constitute obstacles for the motor vehicle, can be detected.

A lidar system for scanning the vicinity of a motor vehicle is already known, for example, from Document EP 2 124 069 B1. In this case as well, a MEMS mirror is used which is arranged so that it can be panned in two different panning directions and can therefore be panned about two axes. This lidar system furthermore has a specially shaped "omnidirectional" emission lens, which makes it possible to emit the emission beam in different spatial directions within a common plane. The sensing of the vicinity is thus limited in this case to a horizontal section of the three-dimensional space, so that scanning in the vertical direction is not possible. This system furthermore has the disadvantage that, in the case of an omnidirectional lens, the power of the emission beam must be split between different directions and a very sensitive receiver is consequently necessary, which must be capable of detecting a very low power of the reception beam. MEMS mirrors are also used for very different purposes in the prior art, namely to generate images with the aid of a projector. Such image projectors are known, for example, from Documents US 2012/0069415 A1 and JP 2007 317 109 A.

It is an object of the invention to provide a solution which can improve an optical object sensing device of the species mentioned in the introduction in comparison with the prior art.

This object is achieved according to the invention by an object sensing device, as well as by a motor vehicle, having the features according to the respective independent patent claims. The dependent patent claims, the description and the figures relate to advantageous embodiments of the invention.

An optical object sensing device according to the invention for a motor vehicle comprises an emitter unit for emitting an emission light beam, a receiver unit for receiving a reception light beam and an electronic evaluation device for detecting an object external to the vehicle in a vicinity of the motor vehicle as a function of the reception light beam. The emitter unit has an emitter—for example a laser diode—for generating the emission light beam. The emitter unit furthermore has a controllable micromirror (MEMS), by means of which the emission light beam can be panned at least in a first panning direction and can therefore scan the vicinity at least in the first panning direction. This means that the micromirror is arranged so that it can be panned at least in the first panning direction—for example in the horizontal direction. The emitter unit furthermore comprises an emission lens, which is arranged behind the micromirror in the emission beam path, or emission path, and through which the emission light beam deviated by the micromirror is therefore emitted. At least along the first panning direction, the emission lens is configured as a concave-convex lens which has on the one hand a concavely curved surface, which faces towards the micromirror, and on the other hand a convexly curved surface, which faces in particular towards the vicinity.

One aspect of the present invention therefore proposes the use of an emission lens which is configured as a meniscus lens at least in the first panning direction. Such a meniscus lens has on the one hand a concave surface and therefore a depression, and on the other hand a convex and therefore curved surface. The use of such an emission lens proves especially advantageous particularly in conjunction with the micromirror. Although omnidirectional sensing, or 360° sensing, may not be made possible with such a meniscus lens, as is achieved in the subject-matter according to Document EP 2 124 069 B1, both a relatively wide sensing range, or sensing angle, in the first panning direction and possibly also scanning of the vicinity in a second direction perpendicular thereto is possible with the aid of such a meniscus lens. Scanning of the vicinity is therefore possible not only along a horizontal section of space but possibly also perpendicularly thereto, i.e. for example in the vertical direction. One great advantage of such a meniscus lens is also that the emission light beam can be emitted with a high radiation strength in comparison with omnidirectional sensing, so that overall a less sensitive receiver can be used, or the reception light beam still has a radiation strength which can be detected without great outlay.

In particular, the emission lens is arranged in relation to the micromirror in such a way that the longitudinal optical axis of the emission lens extends through the micromirror.

At least along the first panning direction, provision may be made for a radius of curvature of the concavely curved surface, i.e. the surface of the emission lens facing towards the micromirror, to be less than a radius of curvature of the convex surface. The outer surface of the emission lens, in relation to the micromirror, is therefore curved less than the inner surface of the emission lens, facing towards the micromirror. This embodiment overcomes the problem that available MEMS mirrors can usually be panned in an angle range which is less than 180°. Specifically, known MEMS mirrors can usually be panned within an angle range of about 100° or less. Because the excursion of available MEMS mirrors is therefore limited, the present embodiment proposes that the emission lens be configured correspondingly so that it allows a sensing angle, or aperture angle, or for example 180°. With a corresponding shape of the emission lens, a larger aperture angle of the sensing device in the first panning direction can be achieved even if the excursion of the micromirror is correspondingly limited. This is made possible by the different radii of curvature of the two surfaces.

It is thus possible to provide an embodiment in which the sensing angle, or aperture angle, of the emitter unit in the first panning direction lies in a value range of from 160° to 180°, and is for example 180°. It is therefore possible to scan a particularly large sensing range of the motor vehicle with a single object sensing device. With a single sensing device, it is therefore possible to detect not only objects which lie for example in the region of the blind spot, but also objects which lie in front of the motor vehicle in the driving direction. The object sensing device can therefore be used for different driver assistance systems in the motor vehicle.

Preferably, the first panning direction is a horizontal direction. When the object sensing device is installed, the micromirror can therefore be panned in the horizontal direction, i.e. about the vertical axis. The first panning direction is consequently an azimuth direction.

The advantages of the invention are fully exploited when the micromirror is mounted so that it can be panned in two different directions overall, specifically, in addition to the first panning direction, also in a second panning direction extending perpendicularly thereto. The emission light beam can therefore also be panned in the second panning direction. The second panning direction is therefore preferably the vertical direction, or the elevation direction, so that the emission light beam can be panned in both the horizontal and vertical directions, and the vicinity can therefore be scanned horizontally and vertically. In particular, provision may be made for the radii of curvature of the respective surfaces of the emission lens in the second (vertical) panning direction to be the same. As an alternative, however, provision may also be made for the radii of curvature to be different—similarly as along the first panning direction—and in this case, for example, for the radius of curvature of the concave surface to be less than the radius of curvature of the convex outer surface. The emission lens is therefore preferably a meniscus lens in the second panning direction as well.

Preferably, the sensing angle of the emitter unit in the second panning direction is less than the sensing angle in the first panning direction. In particular, provision is therefore made for the azimuth sensing angle of the object sensing device to be greater than the elevation sensing angle. In this way, the relevant vicinity regions of the motor vehicle can be checked particularly rapidly with the object sensing device for obstacles possibly present, and the reaction time of the system is particularly short.

In one embodiment, the sensing angle of the emitter unit in the second panning direction lies, for example, in a value range of from 5° to 30°. This sensing angle may, for example, be 5° or 10° or 15° or 20° or 25° or 30°.

The vicinity of the motor vehicle may be sensed with the aid of the optical object sensing device either in columns or in rows. In the case of scanning the vicinity in columns, the emission light beam is panned in the vertical direction alternately between one edge of the vertical sensing angle and the other, while a slower movement of the micromirror takes place in the horizontal direction. The scanning process in this case takes place orthogonally to the horizontal sensing angle. In the case of scanning the vicinity in rows, conversely, the emission light beam is panned to and fro in the horizontal direction between the first and second edges of the horizontal aperture angle, while the micromirror is moved much more slowly in the vertical direction. In this case, the scanning process thus takes place parallel to the horizontal aperture angle. Thus, while a plurality of panning periods of the micromirror are executed in the horizontal direction, during the same period of time the micromirror passes through the full angle range of the vertical sensing angle in the vertical direction only once.

According to one embodiment, the emission lens forms a part—for example a cover or a lid—of a housing of the emitter unit. By means of the emission lens, the micromirror is therefore also protected from external influences. The emission lens thus fulfils two different functions, namely on the one hand the function of the optical lens and on the other hand the function of a housing part.

In respect of the configuration of the receiver unit, the following embodiments may be provided:

When the object sensing device is installed in the motor vehicle, the receiver unit may be arranged above the emitter unit or below the emitter unit. This means that the receiver unit and the emitter unit are arranged distributed along the vertical, or along the direction of the height of the vehicle.

Preferably, the receiver unit comprises a multiplicity of reception elements, in particular photodiodes, as well as a common reception lens, in particular separate from the emission lens, for the multiplicity of reception elements, which is arranged before the reception elements in the reception beam path. The reception lens may be configured as a convex-concave lens with a convexly curved outer surface and with a concavely curved inner surface, which (the concavely curved surface) faces towards the reception elements. The reception elements are preferably avalanche photodiodes. The reception lens is thus likewise—at least in the first panning direction—a meniscus lens, which is used for all the reception elements. With such a reception lens, scanning of the receiver can be obviated, so that the use of a corresponding micromirror in the receiver is superfluous.

The reception lens and the emission lens are preferably the same, or identical, lenses separate from one another. The outlay in respect of the types of lens used is therefore minimal.

As an alternative, however, provision may also be made for a common lens to be used as the reception lens and the emission lens. This common lens may then overlap both the micromirror and the reception elements.

When a common reception lens is used for all the reception elements, it may happen that the signal-to-noise ratio is degraded overall because the reception elements always sense the total sensing range. This leads to significantly greater exposure to extraneous light than in the case of a receiver with a micromirror, while the received signal power remains the same in comparison with a system whose receiver is scanned. The detection threshold would therefore in principle have to be increased, which would lead to a lower sensitivity of the sensing device. This would in turn lead to a shorter range. In order to overcome this, according to one embodiment the reception elements are arranged distributed along an imaginary line of curvature extending in the first panning direction. In other words, the reception elements are arranged distributed behind the reception lens along an annular segment, or in the shape of an annular segment. This line of curvature may extend parallel to the concave surface of the reception lens. The effect achieved by such a distribution of the multiplicity of reception elements is that a single reception element can only receive light from a particular direction, and is "blind" for other incidence directions of the light. For this reason, less extraneous light is also received, and the signal-to-noise ratio is improved overall.

In order to further improve this directional effect of the individual reception elements, each reception element may also be assigned a separate microlens, which is arranged before the respective reception element in the reception beam path. These microlenses are thus arranged between the reception elements, on one hand, and the reception lens on the other hand.

The invention also relates to a motor vehicle having an object sensing device according to the invention.

Other features of the invention may be found in the claims, the figures and the description of the figures. All features and feature combinations mentioned above in the description, as well as the features and feature combinations mentioned below in the description of the figures and/or only shown in the figures may be used not only in the combination respectively indicated, but also in other combinations or separately.

The invention will now be explained in more detail with the aid of a preferred exemplary embodiment, as well as with reference to the appended drawings, in which.

Figure 1:
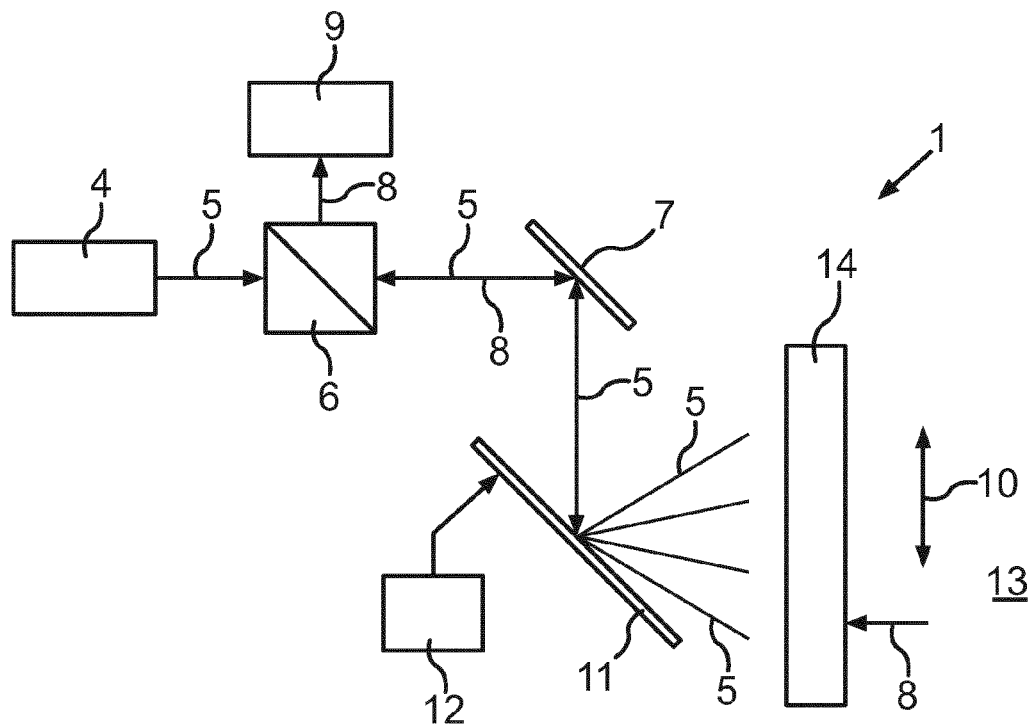
FIG. 1 shows a block diagram of an optical object sensing device according to one embodiment of the invention in a schematic representation.

A block diagram of an optical object sensing device 1 according to one embodiment of the invention is represented in FIG. 1 in a schematic representation. The object sensing device 1 may be installed in a motor vehicle, i.e. for example in a motor car. The object sensing device 1 generally comprises an emitter unit 2 (FIG. 2) and a receiver unit 3 (FIG. 3). The emitter unit 2 comprises an emitter 4, i.e. in particular a laser, which is configured in order to generate an emission light beam 5. The emission light beam 5 may thus be a laser beam.

Arranged downstream of the emitter 4 in the emission beam path, there is an optical switch 6 which has two functions: on the one hand, the switch 6 can transmit the emission light beam 5 so that the emission light beam 5 can propagate to a fixed mirror 7. On the other hand, the switch 6 can also deviate a reception light beam 8 onto at least one reception element 9.

The fixed mirror 7 is thus arranged both in the emission beam path and in the reception beam path.

In order to pan the emission light beam 5 in a first panning direction 10, a micromirror 11 (MEMS) is provided, which is driven with the aid of an electronic control device 12. The micromirror 11 can thus deviate the emission light beam 5 and thus scan a larger region of a vicinity 13 in the first panning direction 10. In the emission beam path, there is furthermore a lens arrangement 14 which, for example, may comprise an emission lens as well as a possibly separate reception lens. As an alternative, a common lens may be provided both for the emission light beam 5 and for the reception light beam 8.

The fixed mirror 7 may optionally be omitted, and the light may propagate directly between the switch 6 and the micromirror 11. In this case, the arrangement of the micromirror 11 with respect to the switch 6 will be adapted accordingly.

The use of a switch 6 is also in principle optional. For instance, the emission beam path and the reception beam path may be fully decoupled from one another, so that the micromirror 11 is used exclusively for the emission light beam 5 while a separate micromirror, or no micromirror, is used for the reception beam path 8.

The lens arrangement 14 is indicated only by way of example in FIG. 1. As already mentioned, this arrangement 14 may comprise a separate emission lens and reception lens, or a common lens for the emission light beam 5 and the reception light beam 8. An exemplary embodiment will be described in more detail below in which two separate lenses are used, and only the emitter unit 2 comprises a micromirror 11 while the receiver unit 3 makes do without such a micromirror, so that the reception light beam 8 is not panned.

Figure 2:
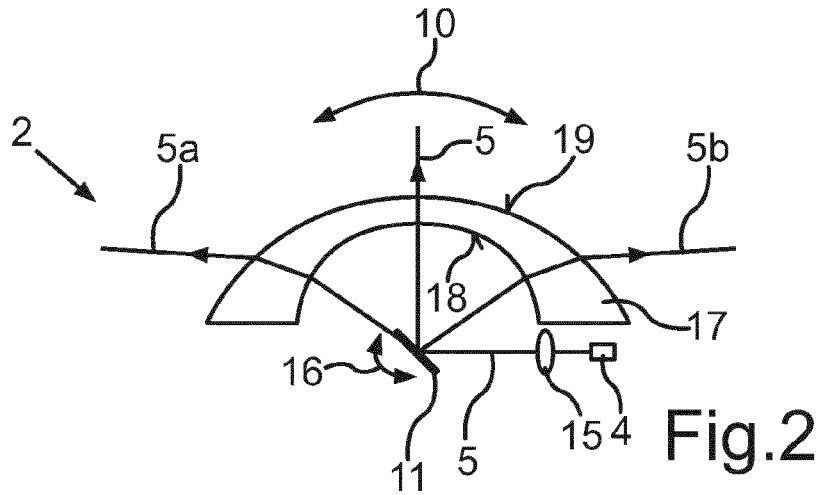
FIG. 2 shows an emitter unit of the object sensing device according to one embodiment in a schematic representation.
Figure 3:
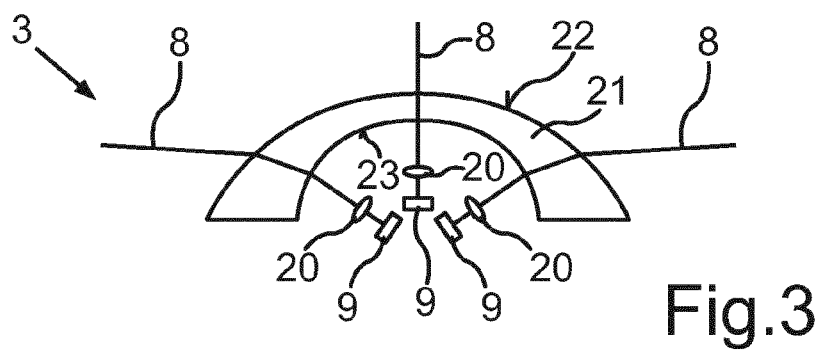
FIG. 3 shows a receiver unit of the object sensing device in a schematic representation.

Referring to FIG. 2, the emitter unit 2 contains the emitter 4, which generates the emission light beam 5. The emission light beam 5 propagates through a lens, optionally a microlens, 15, which constitutes emission optics. The microlens 15 is arranged between the emitter 4 on the one hand and on the other hand the micromirror 11, which can be panned. The micromirror 11 is mounted so that it can be panned in a first panning direction 16 about an axis extending perpendicularly to the plane of the drawing. The emission light beam 5 can therefore be panned in the first panning direction 10. The first panning direction 10 in this case is the horizontal direction, so that the micromirror 11 is arranged so that it can be panned about the vertical. The plane of the drawing thus represents a horizontal plane.

In addition, the micromirror 11 may also be pannable about a second panning axis, namely a horizontal axis. The emission light beam 5 can therefore also be panned in a second panning direction—namely the vertical direction. The emission light beam 5 can therefore be panned on the one hand in azimuth (horizontal direction) and on the other hand in elevation (vertical direction).

The excursion of the micromirror 11 in the panning direction 16 is restricted overall to 90° or 100°, for example. In order then to achieve overall an aperture angle of the emitter unit 2 of for example 180° in the first panning direction 10, an emission lens 17 is used, through which the emission light beam 5 is emitted. This lens 17 thus lies behind the micromirror 11 in the propagation path of the emission light beam 5. The emission lens 17 is in this case a meniscus lens and has a concavely curved inner surface 18, which faces towards the micromirror 11, as well as a convexly curved outer surface 19. The two surfaces 18, 19 may for example be surface regions of a sphere, the radius of curvature of the concave surface 18 being less than the radius of curvature of the convex surface 19. The micromirror 11 lies on a middle optical longitudinal axis of the emission lens 17.

The effect achieved by such a configuration of the emission lens 17 is that an aperture angle of 180° overall can be achieved in the first panning direction 10 even when there is a limited excursion of the micromirror 11 in the panning direction 16. This is possible because of refraction of the emission light rays 5 at the respective surfaces 18, 19 of the emission lens 17. As can be seen from FIG. 2, in an outermost position of the micromirror 11 it is possible to emit an emission light beam 5$a$ which makes an angle of about 180° with a further light beam 5$b$. The second emission light beam 5$b$ is emitted in the second outermost position of the micromirror 11.

The emitter 4 may generate a pulsed light beam with an adjustable frequency, or rate. As an alternative, however, provision may in principle also be made for a continuous emission light beam 5 to be generated by the emitter 4.

FIG. 3 now represents an exemplary receiver unit 3, which is used to receive the reception light rays 8. Preferably, a pannable micromirror 11 is not used on the reception side in this case. Instead, the receiver unit contains a multiplicity of reception elements 9, which are for example configured as avalanche photodiodes. Each reception element 9 is assigned a separate lens, optionally a microlens, 20, which is arranged in front of the respective reception element 9. The receiver unit 3 has a common reception lens 21 for all the reception elements 9, which in particular has the same shape as the emission lens 17.

The reception lens 21 is consequently a meniscus lens, namely a convex-concave lens with a convexly curved outer surface 22 and a concavely curved inner surface 23, which faces towards the reception elements 9. The convex outer surface 22 has a larger radius of curvature than the concave inner surface 23. Reception light rays 8 from different directions can therefore be received by the receiver unit 3.

The reception elements 9 are in this case arranged distributed along an imaginary line of curvature, namely along an annular segment. Such an annular distribution of the reception elements 9 along an imaginary line extending parallel to the surface 23 has the advantage that each reception element 9 can receive light exclusively from a limited spatial direction, and no extraneous light can therefore be coupled into the region of the individual reception elements 9.

Owing to the use of the reception lens 21, the receiver unit 3 also has an aperture angle of 180°, so that overall the sensing angle of the optical object sensing device 1 in the horizontal direction can be 180°. In the vertical direction, in turn, the micromirror 11 is panned within an angle range of for example 10° or 15°, so that the vertical sensing angle of the object sensing device is also correspondingly 10° or 15°.

Figure 8:
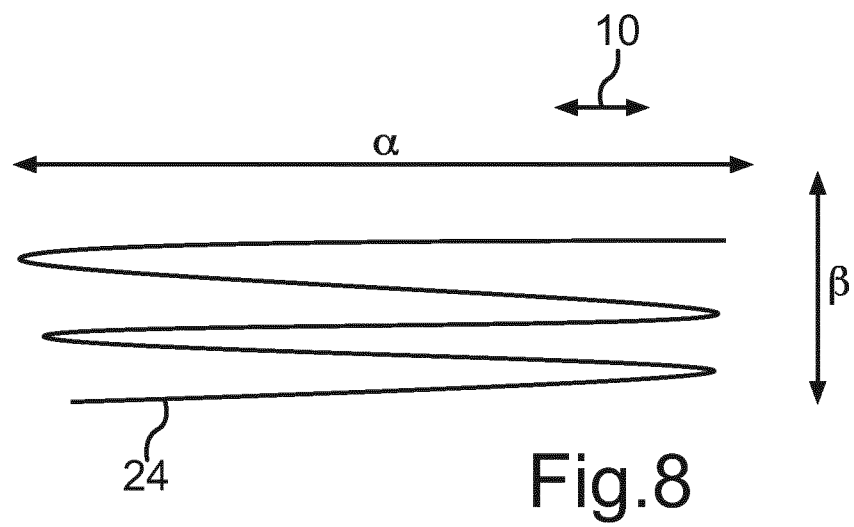
FIGS. 8 and 9 show various possibilities of scanning the vicinity in a schematic representation, distinction being made between scanning in rows and in columns.
Figure 9:
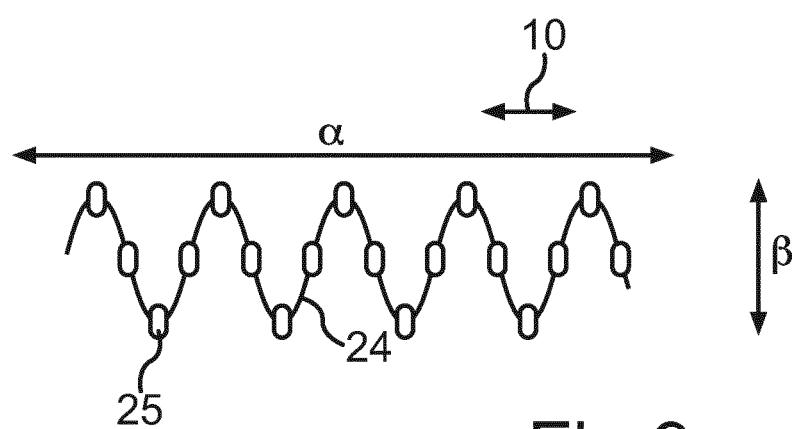

Two possibilities are now provided in respect of the scanning of the vicinity 13: referring to FIGS. 8 and 9, the vicinity 13 of the motor vehicle may be sensed either in rows or in columns. FIG. 8 schematically represents the time profile of the scanning of the vicinity 13 in rows. The horizontal aperture angle, or sensing angle, of the object sensing device 1 is denoted by α, while the vertical sensing angle is denoted by β. The line denoted by 24 in FIG. 8 corresponds to a time profile of a light spot of the emission light beam 5, as seen from the view of the emitter unit 2. Here, the emission light beam 5 is panned to and fro in the horizontal direction, or in the first panning direction, 10, while the micromirror 11 is moved much more slowly in the vertical direction. The scanning of the vicinity 13 thus takes place laterally with respect to the horizontal sensing angle α in this case.

Conversely, FIG. 9 schematically represents scanning of the vicinity 13 in columns. Here, the scanning of the vicinity 13 takes place perpendicularly to the horizontal aperture angle α, i.e. in the vertical direction. The emission light beam 5 is in this case panned to and fro in the vertical direction much more rapidly than in the horizontal direction. FIG. 9 additionally represents exemplary scanning points 25, at which the vicinity 13 can be scanned with the aid of the emission light beam 5.

Figure 4:
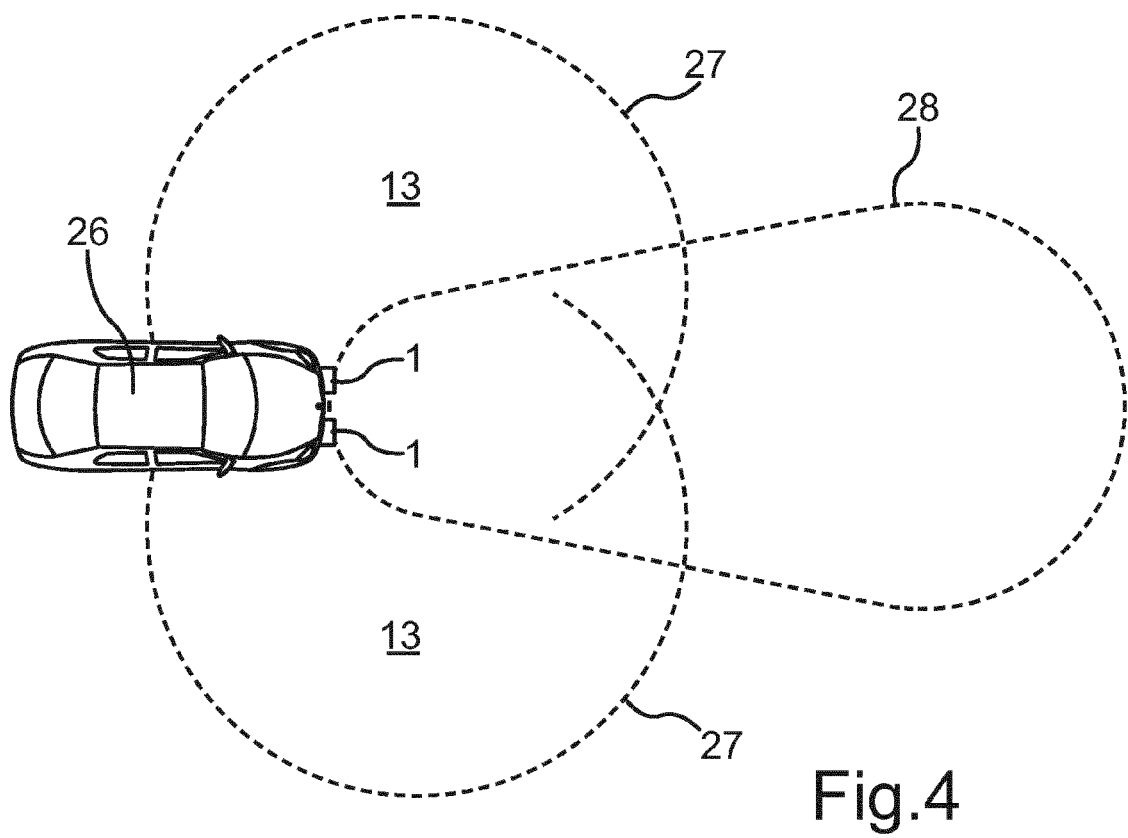
FIGS. 4 to 7 show a wide variety of possibilities for fitting the object sensing device on a motor vehicle.

FIGS. 4 to 7 now represent in more detail possible installation positions of the object sensing device 1 on a motor vehicle 26 and the sensing regions 27 resulting therefrom. In FIG. 4, two said object sensing devices 1 are arranged in the front region of the motor vehicle 26. The left object sensing device 1 senses the vicinity 13 in front of the motor vehicle 26 and on the left-hand side of the motor vehicle 26, while the right object sensing device 1 senses the vicinity 13 on the right-hand side and in front of the motor vehicle 26. The range of the object sensing devices 1 is, for example, 30 m. In addition, a further laser sensing device or a radar instrument with a smaller sensing angle in the horizontal direction is provided in the front region of the motor vehicle 26. The narrower sensing region is denoted here by 28.

Figure 5:
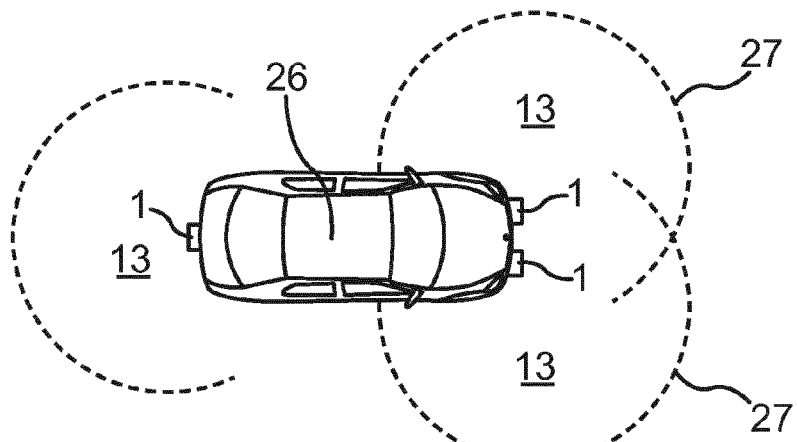

In FIG. 5, besides the two front object sensing devices 1, an optical object sensing device 1 is additionally arranged in the rear region of the motor vehicle 26. This senses the vicinity region 3 behind the motor vehicle 26.

Figure 6:
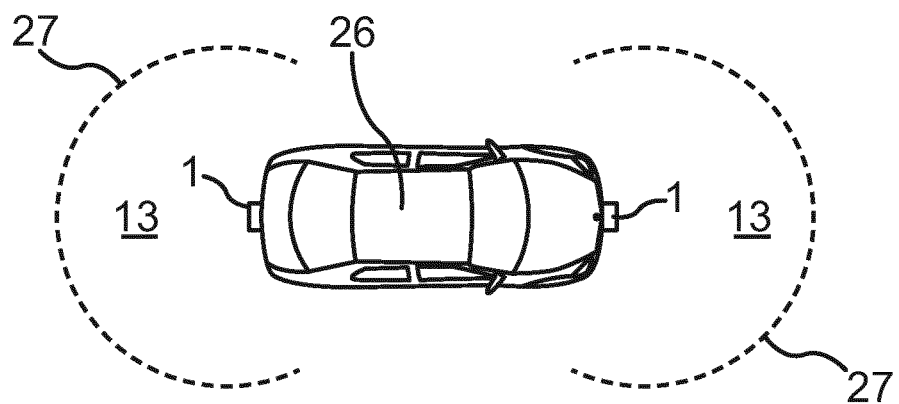

FIG. 6 represents a motor vehicle 26 which respectively has an object sensing device 1 both in the front region and in the rear region. One object sensing device 1 symmetrically senses the vicinity 13 in front of the motor vehicle 26. Conversely, the other object sensing device 1 senses the vicinity 13 behind the motor vehicle 26.

Figure 7:
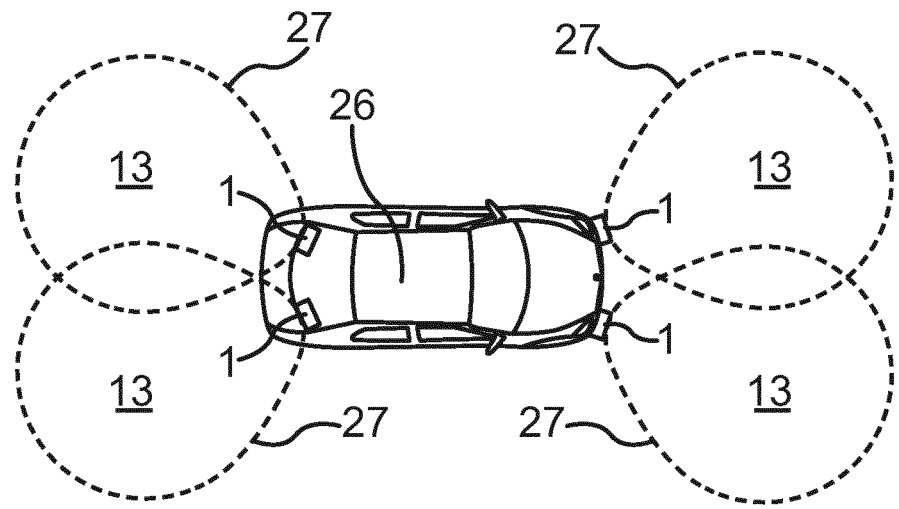

Lastly, FIG. 7 shows a motor vehicle 26 with a total of four object sensing devices 1, which, however, have a somewhat smaller horizontal sensing angle. The object sensing devices 1 in this case sense the respective vicinity regions 13 beside the four corners of the motor vehicle 26.

The invention claimed is:

1. An optical object sensing device for a motor vehicle, comprising:
    an emitter unit for emitting an emission light beam;
    a receiver unit for receiving a reception light beam;
    an electronic evaluation device for detecting an object external to the vehicle in a vicinity of the motor vehicle as a function of the reception light beam,
    the emitter unit comprising an emitter for generating the emission light beam, a controllable micromirror by means of which the emission light beam can be panned at least in a first panning direction, and an emission lens arranged behind the micromirror in the emission beam path,
    wherein at least along the first panning direction, the emission lens is configured as a concave-convex lens with a concavely curved surface, which faces towards the micromirror, and with a convexly curved surface.

2. The object sensing device according to claim 1, wherein at least along the first panning direction, a radius of curvature of the concavely curved surface is less than a radius of curvature of the convexly curved surface of the emission lens.

3. The object sensing device according to claim 1, wherein the sensing angle of the emitter unit in the first panning direction lies in a value range of from 160° to 180°.

4. The object sensing device according to claim 1, wherein the first panning direction is a horizontal direction.

5. The object sensing device according to claim 1, wherein the micromirror is additionally arranged so that it can be panned in a second panning direction extending perpendicularly to the first panning direction, so that the emission light beam can also be panned in the second panning direction.

6. The object sensing device according to claim 5, wherein a sensing angle of the emitter unit in the second panning direction is less than a sensing angle of the emitter unit in the first panning direction.

7. The object sensing device according to claim 5, wherein a sensing angle of the emitter unit in the second panning direction lies in a value range of from 5° to 30°.

8. The object sensing device according to claim 1, wherein the emission lens forms a part of a housing of the emitter unit.

9. The object sensing device according to claim 1, wherein in that the receiver unit comprises a multiplicity of reception elements, photodiodes, and a common reception lens for the multiplicity of reception elements, which is arranged before the reception elements in the reception beam path, the reception lens being configured as a convex-concave lens with a convexly curved surface and with a concavely curved surface, which faces towards the reception elements.

10. The object sensing device according to claim 9, characterized in that the reception lens and the emission lens are the same lenses.

11. The object sensing device according to claim 9, wherein the reception elements are arranged distributed along an imaginary line of curvature extending in the first panning direction.

12. A motor vehicle having an object sensing device according to claim 1.

* * * * *